Figure 11:
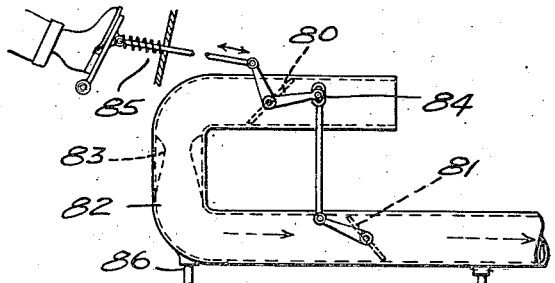

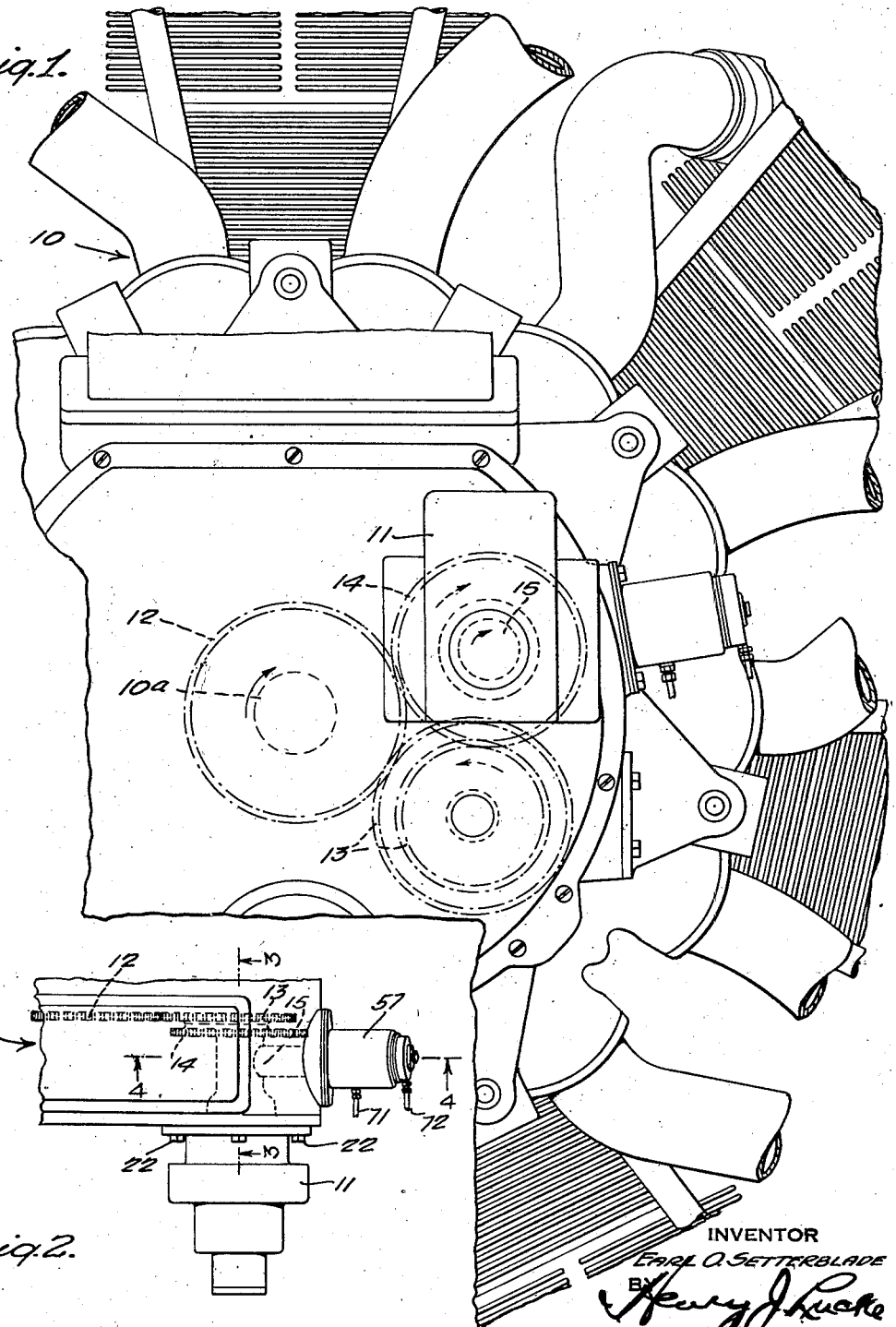

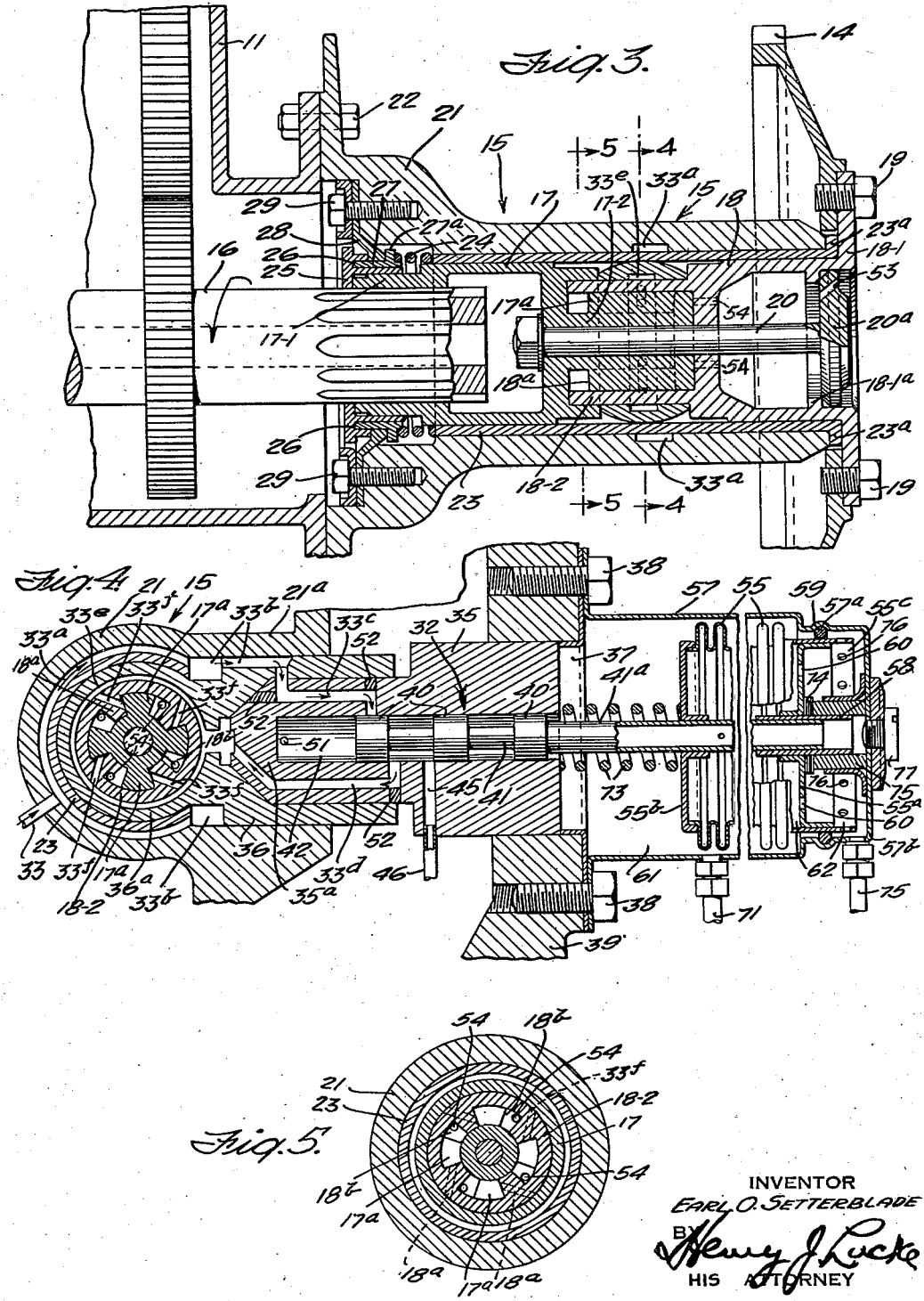

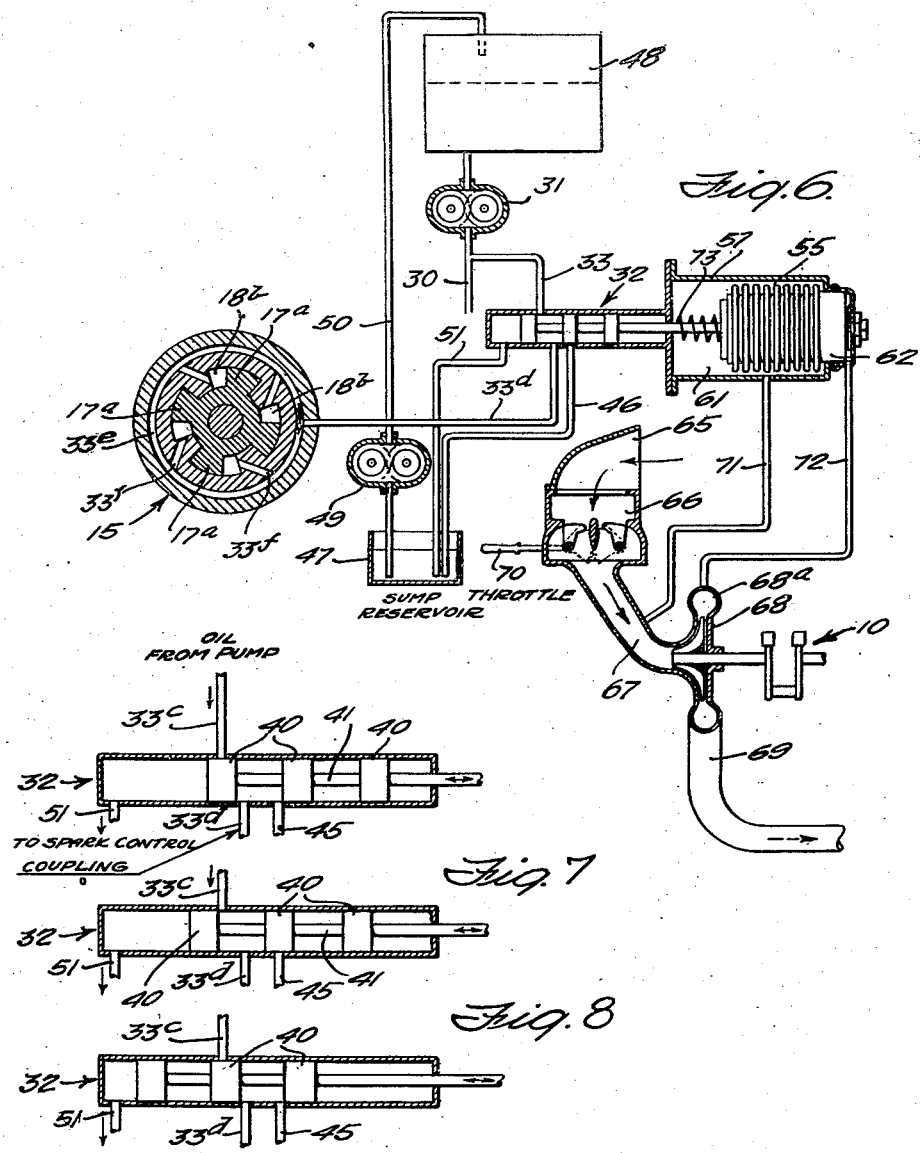

Dec. 11, 1945.  E. O. SETTERBLADE  2,390,619
CONTROL SYSTEM
Filed July 2, 1942  4 Sheets—Sheet 4

INVENTOR
EARL O. SETTERBLADE
BY
HIS ATTORNEY

Patented Dec. 11, 1945

2,390,619

UNITED STATES PATENT OFFICE 2,390,619

CONTROL SYSTEM

Earl O. Setterblade, Glen Rock, N. J., assignor to Wright Aeronautical Corporation, a corporation of New York Application July 2, 1942, Serial No. 449,537

7 Claims. (Cl. 123—117)

This invention relates to automatic controls operable under the influence of fluid pressures, and is particularly related to automatic controls responsive to fluid pressure differences existing from time to time within the intake systems (either air or mixed air and fuel systems) of internal combustion engines. Such controls are ordinarily arranged to automatically vary the settings of accessory devices associated with and playing a part in the operation of the internal combustion engines, so that those devices will always be effective in accordance with the particular requirements of the engines under varying conditions of use.

It is a primary object of the present invention to provide an automatic control of the type described which shall operate largely independent of and without regard to atmospheric pressure, and which shall, thus, be particularly adapted for use with aircraft engines where major differences in altitude produce varying values of atmospheric pressure.

It is a further object to provide an automatic control of the type described which shall be more responsive and sensitive to varying power outputs and load conditions of an internal combustion engine than has hitherto been the case.

Up to the present time it has been customary, in aircraft engines, to set the magneto, during the manufacture of an engine, at an optimum spark timing which is generally satisfactory for all conditions of engine operation, thereby relieving the pilot of manually operating a spark-control lever from time to time during his handling of the aircraft. But, because of this rigid setting of the ignition system, the engine does not always operate at maximum efficiency, with the result that much fuel is wasted, and wear and tear on the engine is greater than it would otherwise be.

With the above in mind, it is a specific object of the invention to provide an automatic system for controlling the spark timing of an aircraft magneto relative to an aircraft engine in accordance with the varying requirements of the engine during operation.

In accomplishing these objects of the invention, I make use of the varying differentials in pressure which exist, or which can be made to exist, between two or more locations within the air or air and fuel intake system or systems of an internal combustion engine, from time to time during operation thereof, such pressure differentials providing an excellent measure of the varying operative characteristics of the engine.

The pressure differentials, made effective and put into action by a suitable pressure-responsive device, such as a diaphragm, Sylphon, or bellows against which the differential pressures are caused to act, are advantageously used to drive a valve mechanism controlling fluid pressure within a conduit. The fluid pressure thus becomes the agency whereby other mechanism is set to operate as desired.

In the instance of control of the spark timing of an aircraft magneto, relative to the aircraft engine, it is preferred, according to the invention, that the drive connection between the magneto and engine proper be made adjustable, for changing the spark timing, instead of rigid with fixed spark timing, as is usual, and that it be so arranged as to be adjustable by means of fluid pressure acting thereon. Under these conditions, a special conduit may be provided from the pressure oil system used for lubricating the engine, and may be valved by means of the valve mechanism which is driven by the pressure-controlled diaphragm or Sylphon. Under this unique pressure control, the valve device itself controls the pressure flow of oil through the special conduit, for adjusting-action against the aforementioned adjustable drive connection between magneto and engine.

When the valve device permits pressure flow of oil through the special conduit, the oil pressure effects the adjustment which changes the spark setting, and maintains the drive connection in the new adjusted position until movement of the valve device releases the pressure and permits the drive connection to assume its original setting of spark timing. In this manner the spark timing of the ignition system of the engine is varied in accordance with engine performance.

Further objects and features of the invention will be apparent from the following detailed description of the preferred embodiments illustrated in the accompanying drawings.

Figure 12:
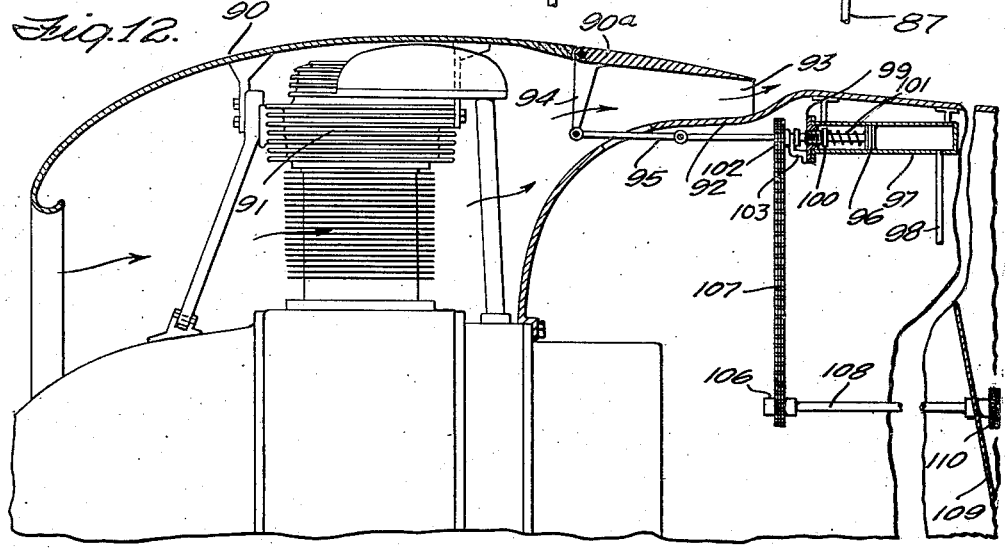
Figure 10:
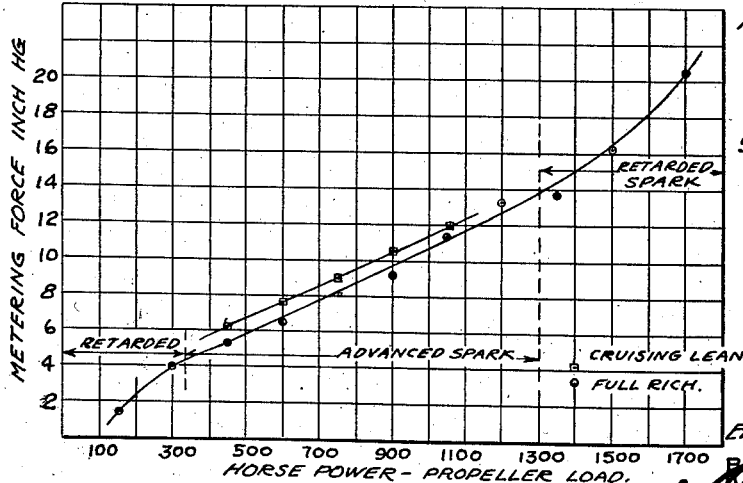
Figure 13:
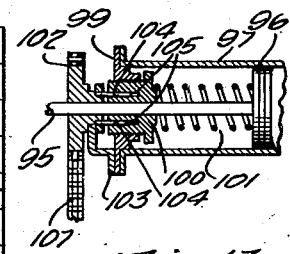

In the drawings:

Fig. 1 represents a fragmentary elevation, taken from the rear, of a conventional type of radial, air-cooled, aircraft engine equipped with a preferred embodiment of the invention arranged to control the ignition spark timing;

Fig. 2, a fragmentary top plan of the aircraft engine of Fig. 1 particularly illustrating the placement of the control device of the invention relative to the magneto drive shaft;

Fig. 3, an enlarged vertical section taken on the line 3—3, Fig. 2, the spark being fully retarded;

Fig. 4, a vertical section taken on the line 4—4, Figs. 2 and 3, and drawn to the same scale as the view of Fig. 3;

Fig. 5, a vertical section taken on the line 5—5, Fig. 3;

Fig. 6, a schematic view of the system of the prior figures, and showing the positions of the component elements when spark is fully advanced;

Fig. 7, an enlarged detail view of the valve device as shown schematically in Fig. 6, but taken when the engine is idling with spark retarded;

Fig. 8, a view corresponding to that of Fig. 7, but taken when the engine is running at cruising speed with spark advanced;

Fig. 9, a view corresponding to those of Figs. 7 and 8, but taken when the engine is running at high speed with spark retarded;

Fig. 10, a graph plotted between propeller load and pressure differentials, or metering force, portraying the relationship therebetween in terms of spark setting pursuant to the invention;

Fig. 11, a diagrammatic view of an engine manifold illustrating a somewhat different arrangement for producing the varying differential pressures used by the control device of the invention;

Fig. 12, a sectional view showing how the control system of the invention can be applied to the opening and closing of the engine cowling at appropriate times, rather than to the control of spark setting; and Fig. 13, an enlarged sectional view of a portion of the mechanism of Fig. 12.

The specific embodiments of the invention here illustrated and described in detail merely exemplify the generic possibilities inherent in the inventive concepts disclosed.

A highly advantageous system for controlling the setting of the so-called spark event of an aircraft engine is illustrated in Figs. 1 through 10.

The engine, indicated generally 10, Figs. 1, 2, and 6, is a standard, radial, air-cooled type provided with a magneto 11 of standard manufacture. As is conventional, the magneto 11 is driven by the crank shaft 10a of the engine 10 by means of drive gear 12, intermediate reduction gearing 13, driven gear 14, and a drive connection or coupling, here indicated generally at 15.

The control system of the invention is incorporated in this standard aircraft assembly with a minimum of change in the accepted design of the latter, and with a minimum of additional mechanism.

Whereas in the standard assembly, the drive connection 15 would be made by means of a unitary rigid shaft allowing no adjustment during operation of the engine, the shaft connection is accomplished in accordance with the invention by means of preferably a bi-sectional spline coupling having separate spline sections loosely fitted together so that one may be rotated a limited distance relative to the other, on the common axis of rotation, during operation of the engine.

This splined shaft connection is well illustrated in Figs. 3, 4, and 5. The drive shaft 16 of the magneto 11 has tightly fitted over its fluted stub end the internally ribbed tubular end 17—1 of spline section 17, the internal ribs mating with the flutes, as illustrated, so the drive shaft and spline section are fixed for rotation together. The spline section 17 has the male spline formation 17—2, which is here shown as having four radial splines or vanes 17a extending circumferentially thereof. A second spline section 18 has a flanged end 18—1 secured to the driven gear 14, as by means of the machine screws 19, and has a female or socket spline-receiving formation 18—2. This spline-receiving formation has internally extending ridges 18a, mutually spaced to form grooves 18b for accommodating the splines 17a of the male spline formation 17—2.

The thickness of a spline 17a is less than the width of a corresponding groove 18b by an amount which provides the desired leeway for rotation of shaft 16 relative to and independently of driven gear 14, in the adjusting of the setting of the magneto 11 from retarded to advanced spark timing.

The two spline sections 17 and 18 have their male and female spline formations 17—2 and 18—2, respectively, interfitted or mated to provide the adjustable drive connection or coupling between engine and magneto. They may be held in proper longitudinal alignment by means of a special bolt 20 extending axially therethrough and provided with an enlarged circular head 20a, which seats against an internally protruding, circumferential ring 18—1a of spline sections 18. The bolt 20 is not cinched so tight as to interfere with rotation of one spline section relative to and independently of the other.

The drive connection or coupling is housed within a casing 21, which may be bolted to the housing of magneto 11, as at 22, Figs. 2 and 3. A sleeve bushing 23 is disposed between the drive connection or coupling proper and the casing 21.

It is desired that the drive connection or coupling be packed in its housing substantially fluid-tight, for a purpose which will appear hereinafter. Accordingly, sleeve bushing 23 has a flanged end 23a which is constantly pressed against the flange of the end 18—1 of spline section 18, by means of a relatively short coil spring 24 acting against the opposite end of the sleeve bushing. An annular end plate 25 is tightly splined to the fluted end of magneto shaft 16, and has an annular groove 26 formed on the inner surface thereof for tightly receiving a circumferential portion of a ring 27. The ring 27 has an external circumferential rib 27a which provides, at one side thereof, abutment for the coil spring 24, and, at the opposite side thereof, a circumferential seat for the retaining washer 28, which is securely bolted to the housing 21, as at 29.

The crank shaft 10a of the motor 10 rotates in the direction of the appended arrow, Fig. 1, and thus drives spline section 18 in the direction of the arrow appended to the drive connection 15. Accordingly, with no other forces acting, the ridges 18a of spline section 18 will abut against the splines 17a of spline section 17 during operation of the engine, and will serve to rotate magneto shaft 16 in the direction of the appended arrow, Fig. 3.

Under these conditions, the spark timing of the magneto relative to the engine is in retard setting. The control system of the invention contemplates, however, that the spark timing shall be advanced during operation of the engine, as required by variations in engine performance. This is accomplished by projecting fluid under pressure through suitable passages in the ridges 18 against the abutting faces of splines 17a, thereby serving to rotate spline section 17 forward relative to spline section 18 to the limited extent permitted by the space available in grooves 18b, and acting to hold the spline section 17 in its new forward position until the fluid pressure supply is cut off and the pressure released.

The oil maintained under pressure in the lubricating system (shown schematically at 30, Fig. 6) of the engine by the oil pump 31 provides an excellent source of fluid pressure for causing the change in spark timing as above described. Its flow is controlled by a valve mechanism indicated generally 32 and described in detail hereinafter, the valve mechanism being itself automatically regulated by the differential pressure control mechanism of the invention, in accordance with engine performance, as will later appear.

The oil flows through the special conduit system, designated generally as 33, which is provided as an offshoot of the main lubricating system 30. The valve mechanism 32 is partially housed in a branch 21a of casing 21, and the special conduit system 33 passes through casing 21, as passage 33a, and through branch 21a, as passage 33b.

The valve mechanism 32 comprises the cylindrical valve body 35, Fig. 4, having the reduced and conically terminating portion 35a, which fits tightly into a correspondingly bored portion of the intermediate cylindrical casing 36. A flanged collar 37, bolted as at 38, to the engine housing 39, serves to tightly hold the valve body 35 in place.

Three valve heads 40, secured in mutually spaced relationship on the valve stem 41, are slidably fitted into valve passage 42, which is defined within valve body 35, and are adapted for reciprocative movement therein.

The intermediate cylindrical casing 36 aids in defining the oil-flow passages 33b, and has an extending annular portion 36a which is snugly fitted about the external periphery of the spline-receiving socket formation 18—2 of spline section 18.

The oil-flow passage 33b communicates with oil-flow passage 33c, which extends through the reduced portion 35a of valve body 35 and opens into the valve passage 42.

Extending from communication with valve passage 42, at a location offset with respect to the port opening of oil-flow passage 33c, and passing through substantially the length of the reduced valve body portion 35a to outlet at the conical terminal end thereof, is oil-flow passage 33d. And communicating with this outlet terminus of oil-flow passage 33d, is the annular oil-flow passage 33e, which is provided by the annular portion 36a of intermediate casing 36.

It will be remembered that the annular casing portion 36a encircles the outer periphery of spline-receiving socket portion 18—2 of spline section 18. Accordingly, in order to establish oil-flow communication between annular passage 33e and the interior of spline shaft connections 15, oil-jet passages 33f are provided diagonally through the ridges 18a of spline section 18 to termination in nozzle openings in those lateral walls of ridges 18a against which splines 17a normally rest.

Oil flow under pressure through the various oil-flow passages of the special conduit system 33, to alter the axial position of shaft 16 relative to driven gear 14, is thus directly controlled by the position of the valve heads 40 of control valve 32.

A by-pass oil passage 45 extends from communication with valve passage 42, at a location offset from the communicating ports of both oil-flow passage 33c and oil-flow passage 33d, to the exterior surface of valve body 35. A by-pass oil conduit 46 connects with passage 45 and extends to a return sump 47, Fig. 6, from where the oil is returned to the reservoir 48 of the lubricating system by means of a return pump 49, disposed in a return pipe line 50. Thus, when the inflow port of oil-flow passage 33d is covered by a valve head 40, precluding flow of oil to the adjustable shaft coupling 15, there is merely a continuous ineffective circulation of oil from oil reservoir 48 to oil-return sump 47, and return.

An oil-drain pipe 51 may extend from communication with the closed end of valve passage 42 to discharge into the sump 47, thereby preventing entrapment of seepage oil. For a similar purpose, a drain passage 53 may be provided through the head 20a of bolt 20, Fig. 3. Also, to prevent back-pressure against the splines or vanes 17a by oil-entrapment, drain passages 54, Figs. 3, 4, and 5, are provided, emptying into the chamber which is closed by bolt head 20a, see Fig. 3.

Oil seals 52 may be provided, as found necessary or advantageous, to prevent seepage loss of oil from the closed circulating system.

The movement of valve stem 41 with its associated valve head 40 is controlled by various pressure differentials effective on the Sylphon or bellows 55, Figs. 4 and 6. The bellows 55 are disposed in a substantially gas tight chamber defined by an auxiliary housing 57, and are arranged in axial alignment with the valve stem 41. A hollow extension 41a of valve stem 41 passes through the chamber, and axially through bellows 55, into sliding engagement with a relatively short sleeve 58, fixed centrally of a circular end plate 55a of the bellows 55. An opposite circular end plate 55b of the bellows 55 is tightly secured intermediate the valve stem extension 41a. Accordingly, the end 55b of the bellows 55 is free to move the valve stem 41 back and forth relative to the fixed end 55a during expansion and contraction of the bellows.

The end plate 55a is inset into the tubular wall structure of the bellows 55 to form an externally cupped end extension 55c; and a circumferential gasket 59, partially set in an internal circumferential groove 57a of the bellows housing 57, provides a pressure-tight seal between the outer periphery of such cupped end expansion 55c and the housing 57. Apertures 60 formed through bellows end plate 55a provide pressure communication between the thus sealed-off terminal end portion of housing 57 and the interior of the bellows.

In the above manner, the chamber formed by the housing 57 is divided into two portions 61 and 62 by means of the expansible and contractable bellows 55, and the valve 32 is operated in accordance with any expansion or contraction of the bellows.

Pursuant to the invention, it is desired that the spark timing of the magneto 11 relative to the engine 10 be varied in accordance with engine performance, and that the control be accomplished automatically by reason of varying differentials between pressures at two or more locations in the intake system of the engine.

In Fig. 6, where the various devices concerned in the specifically disclosed control system of the invention, as well as various conventional devices associated with the aircraft engine 10, are illustrated schematically, the air scoop is designated 65, the carburetor 66, the induction passage 67, the supercharger 68, and the intake manifold 69. The intake of air and gas is regulated manually by the pilot of the aircraft by means of a throttle control 70.

The differential pressures in this intake system of the engine are made effective for control purposes by means of a pipe line 71, extending from communication with the induction passage 67 to communication with the portion 61 of the pressure chamber formed within the auxiliary housing 57, and by means of a pipe line 72, extending from communication with the pressure duct 68a of the supercharger 68 to communication with the portion 62 of the pressure chamber formed within the auxiliary housing 57. Pressure differentials which vary from time to time according to engine performance are, therefore, transmitted to the valve stem 41 of control valve 32, in terms of longitudinal reciprocatory motion, by means of the pressure-sensitive bellows 55.

A coil spring 73 of suitable resiliency is placed between end plate 55b of the bellows and the adjacent end of valve body 35, encircling the valve stem extension 41a, for stabilizing the operation of the bellows 55. The placement of bellows 55 within the pressure chamber of housing 57 may be adjusted by removing or adding one or more shims 74 between the end plate 55a of the bellows and the tubular spacing post 75. Ports 76 are provided about the rim of the cup-shaped extension 55c of the bellows to insure adequate entry of fluid from pressure pipe line 72 should adjustment of the position of the bellows 55 within the pressure chamber bring the extension 55c against the end wall 57b of auxiliary housing 57.

A cap screw and washer assembly, indicated generally 77, may be provided centrally of the end wall 57b of auxiliary housing 57 to provide entry of a suitable calibrating instrument during the testing of the device.

Operation of the spark timing control, just described structurally, is well set forth in the graph of Fig. 10, where, for a specific instance, the varying pressure differentials or metering forces, in terms of inches of mercury, are plotted against horsepower on propeller load. As indicated, when the metering force is between zero and approximately 5 inches of mercury, and the engine is exerting between 0 and approximately 350 horsepower while idling, the spark is retarded; that is, the valve 32 is in the condition shown in Fig. 7, and the spline coupling 15 is in the relative position illustrated in Figs. 3, 4, and 5.

When the metering force is between approximately 5 and approximately 15 inches, and the engine is exerting between approximately 350 and approximately 1300 horsepower while running at cruising speed, the spark is advanced; that is, the valve 32 is in the condition shown in Fig. 8, and the spline coupling 15 is in the relative position shown in Fig. 6, oil from conduit 33c being allowed to flow under pressure through conduits 33d and 33e and through jet conduits 33f against the splines 17a.

When the metering force is above approximately 15 inches, and the engine is exerting greater than approximately 1300 horsepower while running at high speed, the spark is retarded; that is, the valve 32 is in the position shown in Fig. 9, and the spline coupling 15 is back in the position shown in Figs. 3, 4, and 5, since there is no longer oil pressure operative to hold the spline section 17 in the forward position relative to spline section 18.

It is obvious that control systems similar to the one above described may be adapted to other types of internal combustion engines, whether those engines are of aircraft, automotive, stationary, or other type, or whether they employ a plurality instead of a single supercharger, or no supercharger, and, also, that the control systems may be so arranged as to either advance or retard the spark setting in any desired specific relationship to engine performance.

In the embodiment of Fig. 11, adapted for automotive use where superchargers are not ordinarily employed, two throttles 80 and 81 are placed at spaced locations in the intake manifold 82 of the engine at opposite sides of the carburetor 83. The two throttles are mechanically linked together by a delay-action yoke 84 of conventional construction, and are operated in common, as by the conventional accelerator device 85, the second throttle 81 being slightly delayed in its actuation, relative to the actuation of the first throttle 80, by reason of the delay-action yoke.

Differential pressures are provided within the intake manifold 82, at opposite sides of the second throttle 81, by reason of the relationship between the two throttles, and fluid-pressure pipe lines 86 and 87, which correspond, respectively, to the fluid-pressure pipe lines 71 and 72 of the prior embodiment, serve to tap these differential pressures and make them effective on a Sylphon or bellows in exactly the same manner as aforedescribed with respect to the prior embodiment.

The advantageous pressure-sensitive diaphragm and thereby actuated valve arrangement afforded by the present invention for controlling accessory devices by reason of varying pressure differentials existing from time to time within the intake systems of internal combustion engines is not limited in its use to automatically setting the spark timing of the engine, but may be employed for other important purposes. In Figs. 12 and 13 is illustrated apparatus for opening and closing the adjustable cowling of an aircraft engine in accordance with engine performance from time to time.

The cowling 90 of the engine 91 has an adjustable rear flap 90a hinged to open and close with respect to a stationary wall portion 92, and providing, when open, an air flow channel 93, all as is conventional in present day aircraft. An arm 94, depending from the underside of cowling flap 90a, provides a connection for the intermediately jointed push-pull adjusting rod 95.

The free end of rod 95 has a piston disk 96 fitted thereon, which is received within a pressure cylinder 97 for back and forth reciprocatory motion along its length. A fluid-flow pipe line 98 communicates with the cylinder 97 adjacent the closed end thereof, and supplies pressure fluid, such as oil under pressure from the lubricating system of the engine, as fully set forth in connection with the embodiment of Figs. 1 through 10, to the cylinder in accordance with variations in engine performance from time to time during operation of the aircraft.

That end of the cylinder 97 through which the rod 95 extends is closed by a circular plate 99, into and through a central aperture of which is threaded a plug 100, provided with a central longitudinal bore through which the rod 95 slides. A coil spring 101 of suitable resiliency is interposed between the plug 100 and the piston disk 96 for normally maintaining the piston disk in operative position within its cylinder and the cowl flap 90a in open position. It is only when there is fluid pressure in the pipe line 98 that the piston and connecting rod assembly holds the cowl flap in closed position.

Provision is made for the pilot to manually adjust the degree of opening of cowl flaps 90a. A sprocket wheel 102 is mounted for free rotation on the rod 95, being held in place by a bracket piece 103. Pins 104 are anchored in the sprocket wheel 102 and extend into corresponding receiving recesses 105 provided in the plug 100, the recesses 105 being sufficiently long to allow longitudinal movement of the plug relative to the sprocket wheel and to the pins projecting therefrom.

The sprocket wheel 102 is interconnected with a drive sprocket wheel 106 by a chain drive 107. The drive sprocket wheel 106 is fixed on a shaft 108 which projects through the instrument panel 109. A knurled hand-wheel 110 is fixed on the projecting end of shaft 108, and affords means whereby the pilot of the aircraft may manually adjust the position of hinged flap 90a, and the size of the air flow opening 93, when desired. Because of the sprocket drive arrangement and of the pins 104 extending into receiving slots 105, the plug 100 is screwed either backwardly or forwardly relative to end plate 99 when the hand-wheel 110 is rotated, thus moving the piston head 96 and its rod 95 by reason of coil spring 101.

In each of the above described specific embodiments of the invention, the fluid pressure employed to accomplish the actual adjustment and setting of devices accessory to the engine may be furnished by means other than the pressure oil system used for lubricating the engine. An auxiliary reservoir of any suitable fluid, as for instance of compressed air, may be provided to supply the desired fluid pressure.

If found suitable in particular instances, more than one pressure-responsive device, such as the bellows and pressure chamber here illustrated, may be employed to actuate the valve stem of the control valve 32, or the proper element of some other adjustment-control device. In such instances, the pressure-responsive devices may be arranged in tandem so their respective resultant responses may be collectively impressed upon such valve stem or other proper element. In this manner, several differential pressures existing within the intake system of an internal combustion engine may be utilized to control the adjustment of a device or devices accessory to the engine.

Whereas this invention is here described with respect to preferred specific forms thereof, it should be understood that many changes may be made in such specific forms and that many other specific forms may be developed by those skilled in the art without departing from the spirit and generic purview of the invention as set forth herein and in the claims which here follow.

I claim:

1. A system for automatically changing the spark timing of an aircraft magneto relative to an aircraft engine in accordance with variations in engine performance from time to time, the magneto having driven means controlling the spark and spark timing relative to the engine, and the engine having drive means adapted to drive the said driven means of the magneto, said system comprising a variable shaft coupling connecting said engine drive means with said magneto driven means, said shaft coupling including a shaft portion fixed to said engine drive means and a separate shaft portion fixed to said magneto driven means, said shaft portions being so interengaged as to normally cause said magneto to be driven at one spark timing, but as to afford leeway for limited rotation of said magneto shaft portion, relative to and independent of said engine shaft portion, to a position for causing said magneto to be driven at a different spark timing; vane means rigidly connected with said magneto shaft portion; fluid-pressure conduit means terminating at said vane means and adapted to project fluid under pressure against said vane means and to thus cause the said limited rotation of said magneto shaft portion relative to and independent of said engine shaft portion, as well as maintenance of the new position of said magneto shaft portion so long as the said fluid under pressure is maintained in said conduit; means for supplying said conduit with fluid under pressure; valve means associated with said conduit means for controlling fluid flow from said fluid-pressure supplying means to said vane means; pressure-responsive means; means for impressing differential pressures, existing within the intake system of the said engine, upon said pressure-responsive means so as to effect response thereof in accordance with the resultant pressure differentials; and means for controlling said valve means in accordance with the varying responses of said pressure-responsive means occurring from time to time during operation of said engine.

2. A system as recited in claim 1, wherein the means for supplying the fluid-pressure conduit with fluid under pressure constitutes the pressure oil system for lubricating the engine.

3. A system as recited in claim 1, wherein the shaft coupling is in the form of a loose spline connection, the magneto shaft portion having a male spline formation fitted into a receiving socket formation of the engine shaft portion, and wherein the splines of the said male spline formation provide the vane means against which fluid under pressure is projected by the fluid-pressure conduit means.

4. In ignition timing apparatus for an engine having an induction system, an impeller for said induction system, first and second shafts drivably connected to the engine and timing apparatus respectively, coupling means between said shafts comprising a loosely interfitted axial spline connection permitting limited rotative movement between said shafts, and means operative to rotatively advance said second shaft relative to said first shaft in response to the differential pressure across said impeller.

5. In ignition timing apparatus for an engine, a first shaft drivably connected to said engine, a second shaft connected to said timing apparatus, coupling drive means between said shafts comprising a loosely interfitted axial spline connection permitting limited rotative movement between said shafts, and means operative in response to a condition of said engine to rotatively advance said driven shaft relative to said driving shaft.

6. In ignition timing apparatus for an engine, a first shaft drivably connected to said engine, a second shaft concentric with said first shaft and drivably connected to the timing apparatus, coupling means between said shafts comprising loosely interfitted axial driving abutments permitting limited rotative movement between said members, a source of fluid pressure, and means operative to apply said fluid pressure to said coupling to rotatively advance said second shaft relative to the first shaft.

7. In ignition timing apparatus for an engine, a first member drivably connected to said engine, a second member connected to the timing apparatus, coupling means between said members comprising loosely interfitted axial driving abutments permitting limited rotative movement between said members, and means operative to rotatively advance said second member relative to said first member in response to a condition of said engine.

EARL O. SETTERBLADE.